Sept. 21, 1965    J. HOURDIAUX    3,208,077
TAKING OF MOVING PICTURES WITH A RELIEF EFFECT
Filed March 17, 1961    3 Sheets-Sheet 1
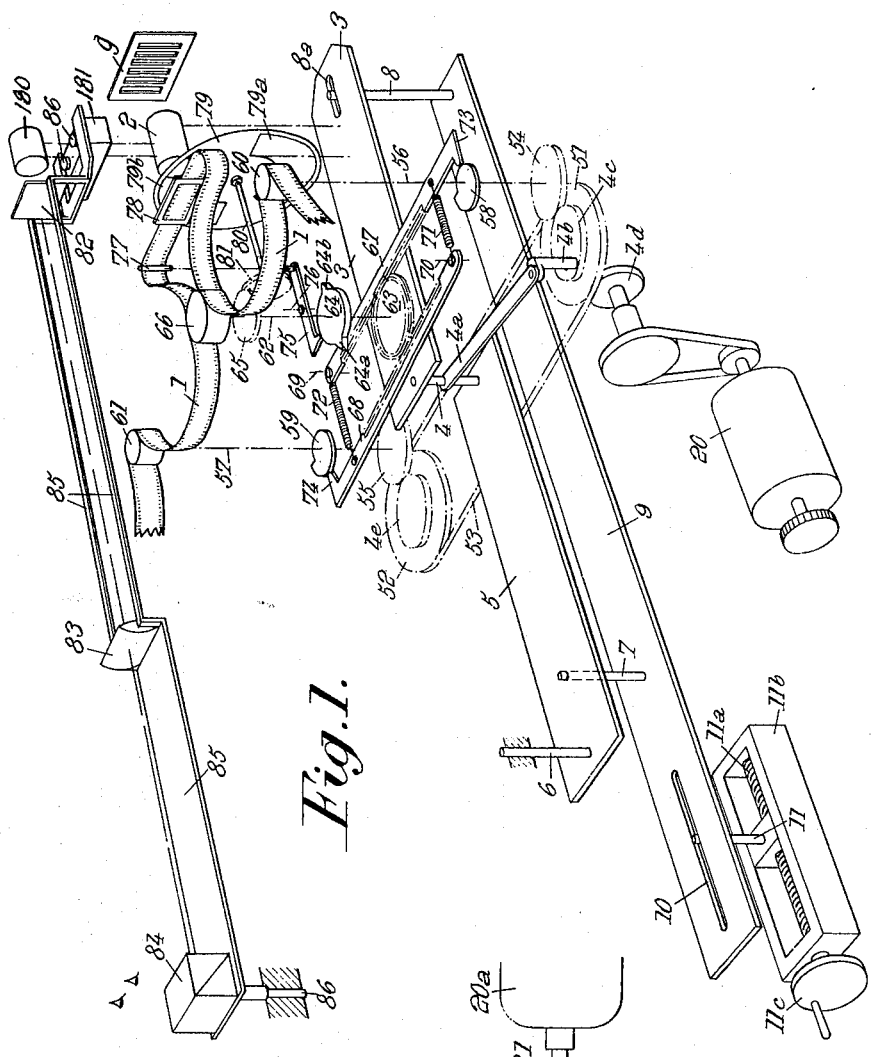

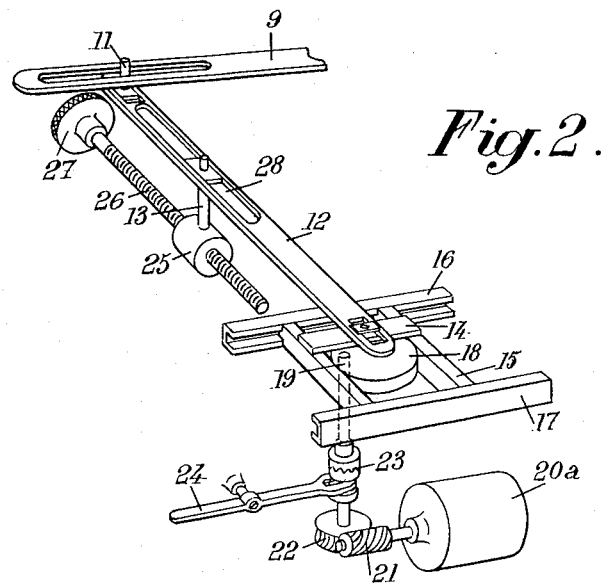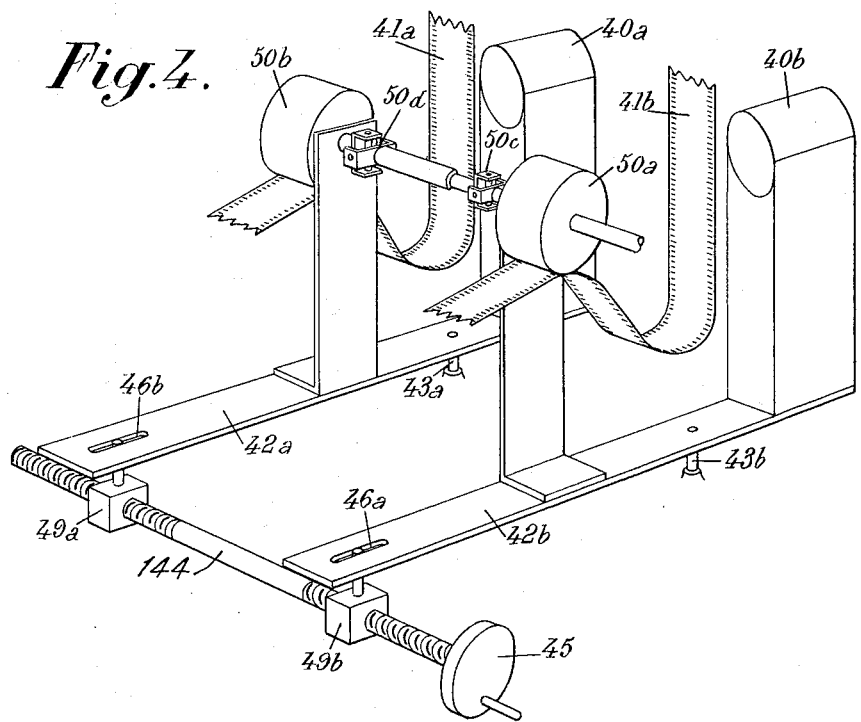

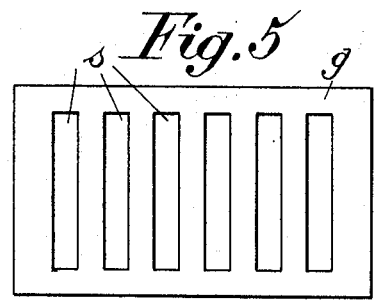
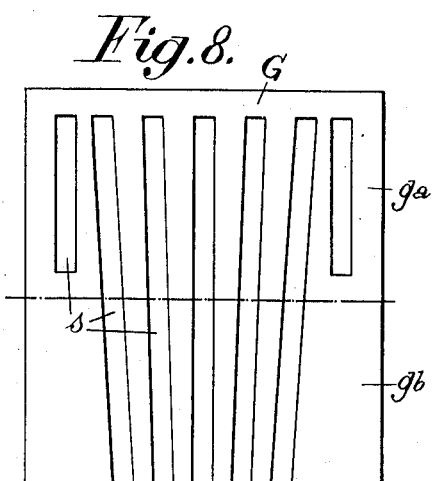
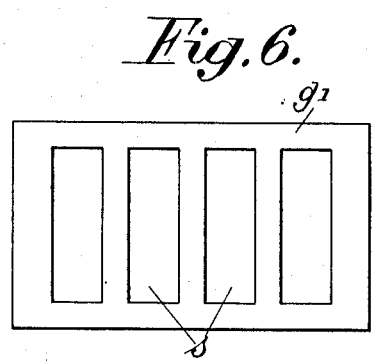
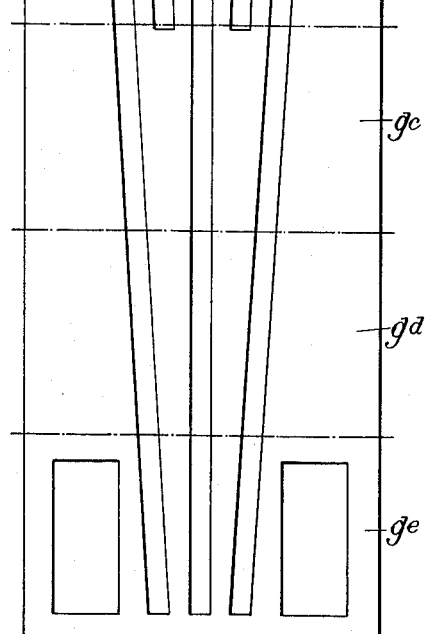
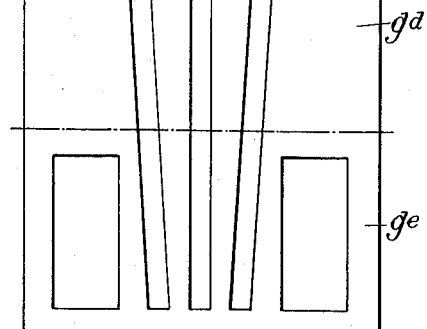
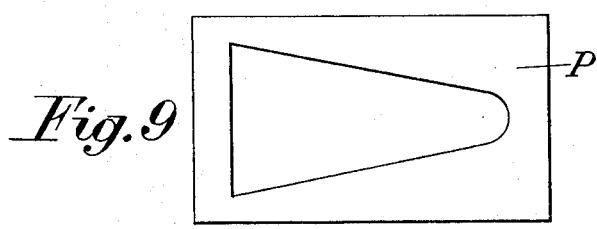

3,208,077
TAKING OF MOVING PICTURES WITH
A RELIEF EFFECT
Jules Hourdiaux, 96 Ave. de Versailles,
Paris 16e, France
Filed Mar. 17, 1961, Ser. No. 96,529
Claims priority, application France, Jan. 28, 1953,
641,892, Patent 1,076,958
2 Claims. (Cl. 352—62)

This application is a continuation-in-part of my U.S. patent application Serial No. 406,558, filed January 27, 1954, now abandoned.

The present invention relates to motion picture cameras and more particularly to cameras which provide a relief effect.

To achieve the objective of providing an improved camera, according to my invention, the lens of the camera is carried by a member movable in a camera frame with an oscillating angular displacement about a constantly varying vertical pivot axis located ahead of the camera, this oscillating displacement taking place on either side of a middle sighting line fixed with respect to the camera frame, this member being operated by actuating means so that the point of intersection of the lens optical axis with said line has a reciprocating displacement along said line, means being provided to adjust the action of said actuating means so that the range of this reciprocating movement can be varied either manually or automatically.

Preferred embodiments of my invention will be hereinafter described merely by way of example in the accompanying drawing in which:

FIG. 1 is a diagrammatic perspective view of a camera according to the present invention;

FIGS. 2 and 3 are perspective views of modifications of parts of the camera shown by FIG. 1;

FIG. 4 is a diagrammatic perspective view of a modification including two lens systems;

FIGS. 5, 6 and 7 are separate views showing different masks to be used according to my invention;

FIG. 8 is a similar view showing a composite mask to be adjusted vertically with respect to the lens;

FIG. 9 is a detail view showing a diaphragm plate to be mounted in front of the pivoting lens;

FIG. 1 diagrammatically shows an embodiment of a mechanism for imparting the desired motion to a lens system. The film is run horizontally because the relief effect is obtained by human eyes normally positioned in the same horizontal plane.

Lens 2, which is of suitable construction and may be fitted with the usual focussing and adjusting means, is mounted upon a horizontal arm 3, the rear end of which is pivoted by a vertical pivot pin 4 on a horizontal arm 5 pivoted about a fixed vertical pivot axis 6 carried by the camera frame diagrammatically indicated by the hatchings about axis 6. A horizontal arm 9 is pivoted to arm 5 by a vertical pin 7 and its front end carries a pin 8 slidable in a slot 8a of arm 3.

The rear end of arm 9 is provided with a longitudinal slot 10 in which is engaged a pin 11 movable in a vertical plane passing through pivot axis 6. For this purpose pin 11 is carried by a block slidable in a longitudinal box 11b fixed in the camera frame, this block being slidable by means of a screw 11a journalled in this box and rotatable by means of a hand-wheel 11c.

Pin 4 carries, pivoted thereto about a vertical axis, a link 4a the other end of which is pivoted on a pin 4b eccentrically mounted on a wheel 4c journalled on a fixed axis in the camera frame and driven by a motor 20 through a wheel 4d and belt and pulley transmission means.

If it is desired automatically and periodically to vary the position of pivot pin 11 (instead of having this adjustment varied manually by means of the hand-wheel 11c of FIG. 1), the pin 11 can be carried by one end of a two-arm lever 12 (FIG. 2) pivoted about a pin 13 and the other end of which is pivoted to a cross piece 14 of a frame 15 slidable with a reciprocating motion between guides 16 and 17 parallel to the direction of movement of pin 11. The reciprocating motion of frame 15 is imparted thereto by means of an eccentric cam 18. Cam 18 is fixed on a vertical shaft 19 driven in a continuous manner by motor 20a which drives shaft 19 through a worm and worm wheel 21, 22.

Preferably, as shown by the drawing, shaft 19 is made of two portions connected together by a clutch 23 operated by a handle 24. Thus the movement of cam 18 can be stopped or started at will.

The position of pivot 13 is made adjustable along lever 12 in order to make it possible to adjust the amplitude of the automatic reciprocating motion of pin 11. This adjustment of pin 13 is for instance obtained by mounting said pin upon a threaded sleeve 25 engaged on a threaded rod 26 controlled by an adjustment knob 27. When rod 26 is rotated in one direction or the other, sleeve 25 is displaced in one direction or the other along a slot 28 provided longitudinally in lever 12. I thus modify the position of pivot pin 13 and consequently the amplitude of the reciprocating movement of pin 11 in the slot 10 of rod 9. This correspondingly modifies the variation of the amplitude of oscillation of lens 2.

Furthermore, the speed with which pivot pin 11 is moving from one end position to the other can be modified by making use of a motor 20a having a variable speed or by interposing, between motor 20a and the worm and worm wheel unit 21–22, a change speed device analogous to that shown by FIG. 3. Such a device includes a disc 29 fixed on a shaft 30 of worm wheel 21. On the shaft 31 of motor 20a, there is slidably mounted a sleeve 32 the free end of which carries a roller 33 which is running frictionally on disc 29, the distance between the point of contact of this roller and the axis of rotation of disc 29 being modified at will by causing sleeve 32 to slide along shaft 31 by means of a pivoting handle 34 including a fork 35 freely engaging a peripheral groove provided in sleeve 32.

Returning to FIG. 1, sprocket wheels 51, 52 are journalled in the camera frame on fixed vertical axes located on opposite sides of the mean position of arm 3. These wheels 51, 52 are interconnected through an endless chain or belt 53. One of them, 51, is rigid with the above mentioned wheel 4c and the other one is rigid with a wheel 4e. Wheels 4c and 4e drive, through pinions 54 and 55 respectively, two shafts 56 and 57 (diagrammatically represented by dot-and-dash lines). On these shafts are mounted, respectively, cams 58 and 59 and toothed drums 60 and 61, these two last mentioned drums belonging to the mechanism for intermittently driving film 1.

Arm 3 carries, journalled therein about a vertical axis, a shaft 62 on which are fixed a toothed wheel 63, a wheel 64, provided with two projections 64a and 64b, a bevel toothed wheel 65 and a film driving toothed drum 66.

Toothed wheel 63 is intended to cooperate with two racks 67 and 68 pivoted in the camera frame about respective fixed axes diagrammatically shown at 69 and 70. These racks are urged toward each other (and therefore toward their positions of engagement with toothed wheel 63) by springs 71 and 72. The free ends of said racks form projections 73 and 74, respectively, in cooperating abutment with cams 58 and 59. These cams are angularly offset with respect to each other so that when one of the racks is in engagement with toothed wheel 63, the other one is not, and vice-versa. Thus, during the oscillating movement of arm 3, which carries wheel 63, this wheel is, for one half-oscillation, taking place in one direction, in mesh with one of the racks, and for the other half-oscillation, taking place in the opposed direction, in mesh with the other rack. Thus, except for the very short time intervals for which wheel 63 is leaving one of the racks and going to engage the other one, this wheel is constantly being rotated about its axis, always in the same direction, due to its rolling along the two racks, alternately.

Owing to this movement of wheel 63, shaft 62 is driven, always in the same direction, with two short interruptions on every revolution.

During every half-revolution of shaft 62 one of the two projections 64a, 64b of wheel 64 fixed on said shaft produces an oscillation of a lever 75, pivoted on the camera frame about a fixed vertical axis 76. This lever carries a vertical beater arm 77 (partly shown in dot-and-dash lines) which then pulls a loop formed by film 1 so as to cause the film to move toward the left through gate 78. Furthermore the film is being constantly fed by the action of toothed drums 60, 61 and 66 driven as above explained. The sinuous shape of film 1 shown by the drawing results from its resiliency and from the fact that it is urged toward the front wall of gate 78.

A shutter 79 is provided to cut off the transmission of light from lens 2 to the film when this film is being pulled by the mechanism above described. This shutter 79 is carried by a horizontal shaft 80 journalled in a support (not shown) carried by arm 3 and keyed on a bevel wheel 81 in mesh with the above mentioned bevel wheel 65 carried by vertical shaft 62.

Shutter 79 is provided with two arcuate slots 79a and 79b through which the film is exposed while it is stationary in gate 78, i.e. during the longer part of every half-oscillation (in one direction or the other) of arm 3, the solid portions of said shutter disc 79 cutting off the transmission of light from lens 2 to the film during the remainder of each of said half-oscillations, when the film is being pulled by beater arm 77 to bring a new frame into gate 78.

Thus, in the embodiment above described and illustrated by FIG. 1, there is one exposure every time arm 3 is rotating in the clockwise direction and another exposure every time arm 3 is rotating in the anti-clockwise direction. It will be understood that, by providing a single projection on wheel 64 and a single arcuate slot in shutter disc 79, I might have one exposure during every rotation of arm 3 in a given direction, say the clockwise direction, and no exposure during every rotation of arm 3 in the anti-clockwise direction, the shutter being then closed and the film pulled to pass from one frame to the next one.

I might also have more than two exposures for every complete oscillation of arm 3 (the number of projections of wheel 64 and of arcuate slots in shutter discs 79 being then also greater than two).

With a camera as above described, it is of primary importance to have a view finder to show at any time the optical field of lens 2. According to my invention, the view finder comprises an optical system 180 carried by a support 181 fixed on the support of lens 2, the optical axis of system 180 being parallel to that of lens 2. A frosted glass screen 82 is located behind optical system 180 so as to receive therefrom an image substantially the same as that formed by lens 2 on the part of film 1 present in gate 78. This image, conveyed through a lens 83 is reflected by a prism 84 so as to be visible to an observer looking down at said prism. Screen 82, lens 83 and prism 84 are carried by an arm 85 pivoted about an axis 86 fixed on the camera frame, at the rear part thereof and located in the vertical plane containing pivots 6 and 11. The front end of arm 85 is forked and engages two rollers 86 resiliently mounted on support 81.

In the preceding description it has been supposed that film 1 moves in the horizontal direction so that the images are so disposed that their height is transverse with respect to the film. In order to project the picture on a screen by means of an ordinary projector in which the film is moving vertically, the frames of the horizontal film must of course be transferred onto a vertical film by means of a suitable printing machine through mirrors or prisms.

FIG. 4 shows a camera for taking stereoscopic pictures by means of two lens systems 40a and 40b disposed at a distance from each other corresponding to the usual distance between the eyes of a person. The pictures are taken on two films 41a and 41b which run in the vertical direction. The respective lens systems are carried by two arms 42a and 42b the ends of which located close to the films are mounted about fixed pivots 43a and 43b which are located respectively opposite the longitudinal vertical axes of the films. The other ends of arms 42a, 42b are provided with slots 46a, 46b cooperating with pins carried by blocks 49a, 49b provided with threaded holes in which are respectively engaged the two portions, respectively threaded left and right, of a screw 144 which may be turned through any suitable means, for instance by a hand-wheel 45.

The relative movement of arms 42a and 42b takes place between limits such that, for one limit position, these arms are substantially parallel to each other and that, for the other position, they converge toward each other in the direction of the film 41a and 41b, that is to say the ends mounted on screw 144 are moved away from each other.

In order constantly to ensure synchronism of the mechanism (diagrammatically represented at 50a and 50b) for driving the films, these mechanisms are interconnected through means including two swivel joints 50c and 50d.

The grids g which are positioned in front of lens 2 may be of many different shapes and some of these have been shown by FIGS. 5, 6 and 7. It may be advantageous to vary the shape and arrangement of these grids when the picture taking conditions vary and in particular when the main object to be photographed is at a varying distance from the camera. For this purpose, as shown by FIG. 8, a mask G may include several portions such as $g_a$, $g_b$, $g_c$, $g_d$, $g_e$ and this mask G is slidable vertically so that any of these portions $g_a$, $g_b$, $g_c$, $g_d$, $g_e$ can be brought to the level of lens 2.

In order to obtain a suitable exposure of the film, I further place parallel to any of these masks g a plate P such as shown by FIG. 9, this plate being provided with a triangular hole which acts as a kind of diaphragm when the lens system is moving horizontally along the middle line of this triangular slot.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A camera for taking a movie picture with a relief effect, said camera comprising: a frame, the camera having a sighting line fixed relative to said frame, a vertical pivot on said frame, a first horizontal arm connected to said pivot, a second horizontal arm, a second vertical pivot spaced from the first said pivot and connecting said arms in generally coextensive relation, an objective lens fixed on said second arm and having an optical axis parallel to the second arm, said second arm being provided with a slot aligned with said second pivot, a third horizontal arm, third and fourth vertical pivots spaced on said third arm, said third pivot extending into and being slidable in said slot, said fourth pivot pivotally engaging said first arm between said first and second pivots, said third arm being provided with a slot aligned with said fourth pivot, said fourth pivot being located between said third pivot and the latter said slot, said arms being adapted to assume an alignment in which all of said arms are parallel to said sighting line, motor means coupled to said second pivot to reciprocate the same with opposite movements generally transverse of said sighting line, adjustment means including a vertical pin adjustable in the slot in the third arm whereby the oscillation of the third and thereby the second arm is controlled, a film gate and shutter means on said second arm adjacent said lens, said shutter means being adapted for intermittently exposing film present in said gate, means driven by said motor means for operating said shutter means to expose the film during at least a portion of the movements of said second arm and to shield the film from said lens during a portion of the movements of said second arm, and intermittent driving means on said second arm and operated by said motor means for pulling film through said gate each time said shutter means shields the film from said lens, said second arm being oscillatable angularly to either side of said sighting line and about a constantly varying vertical pivot axis located ahead of the camera, the optical axis of said lens and said sighting line having an intersection having a linear reciprocating displacement along said sighting line, said adjustment means enabling variation of the range of reciprocation of said intersection along said line.

2. A camera according to claim 1 further comprising a view finding device including an optical system carried by said second arm and having an optical axis parallel to that of said lens, a fourth horizontal arm pivoted to said frame about a vertical axis, means for connecting said fourth arm with said second arm, a vertical frosted glass screen carried by said fourth arm above said film gate, a mirror on said fourth arm above the pivot axis thereof, and means for conveying the image formed on said screen to said mirror.

References Cited by the Examiner
UNITED STATES PATENTS

| | | | |
|---|---|---|---|
| 1,596,835 | 8/26 | Hewson | 88—1 |
| 1,850,641 | 3/32 | St. Genies | 352—85 |
| 2,150,932 | 3/39 | McDonnell | 95—18 |
| 2,644,382 | 7/53 | Ayres | 352—64 |

FOREIGN PATENTS

| | | |
|---|---|---|
| 178,344 | 4/22 | Great Britain. |
| 319,406 | 9/29 | Great Britain. |
| 584,517 | 1/47 | Great Britain. |

JULIA E. COINER, *Primary Examiner.*
EMIL G. ANDERSON, NORTON ANSHER,
*Examiners.*